United States Patent [19]

Mountain

[11] Patent Number: 4,798,477
[45] Date of Patent: Jan. 17, 1989

[54] APPARATUS AND METHOD FOR STATIC STRESS MEASUREMENT IN AN OBJECT

[75] Inventor: David S. Mountain, Waterlooville, United Kingdom

[73] Assignee: The Secretary of State for Defence in Her Britannic Majesty's Government of the United Kingdom of Great Britain and Northern Ireland, London, United Kingdom

[21] Appl. No.: 865,726
[22] PCT Filed: Sep. 9, 1985
[86] PCT No.: PCT/GB85/00403
  § 371 Date: Jun. 24, 1986
  § 102(e) Date: Jun. 24, 1986
[87] PCT Pub. No.: WO86/01893
  PCT Pub. Date: Mar. 27, 1986

[30] Foreign Application Priority Data

Sep. 11, 1984 [GB] United Kingdom ............... 8422873

[51] Int. Cl.⁴ ...................... G01N 21/17; G01N 25/00
[52] U.S. Cl. ........................... 374/45; 374/5; 374/121
[58] Field of Search ............ 374/57, 5, 7, 46, 50, 374/47, 124; 356/432 T

[56] References Cited

U.S. PATENT DOCUMENTS

| | | | |
|---|---|---|---|
| 1,327,341 | 1/1920 | MacDonald et al. | 374/5 |
| 3,222,917 | 12/1965 | Roth | 374/5 |
| 3,451,254 | 6/1969 | Maley | 374/124 X |
| 3,504,524 | 4/1970 | Maley II | 374/5 |
| 3,629,584 | 12/1971 | Blomgren, Jr. | 374/5 |
| 3,698,234 | 10/1972 | Allinikov | 374/5 |
| 3,803,413 | 4/1974 | Vanzetti et al. | 250/338 |
| 4,019,365 | 4/1977 | Woo | 374/46 |
| 4,243,327 | 1/1981 | Frosch et al. | 374/5 |
| 4,378,701 | 4/1983 | Mountain et al. | 374/47 X |
| 4,452,538 | 6/1984 | Reger et al. | 374/124 |
| 4,468,136 | 8/1984 | Murphy et al. | 374/57 X |
| 4,521,118 | 6/1985 | Rosencwaig | 374/5 |

FOREIGN PATENT DOCUMENTS 2186137 12/1973 France .

OTHER PUBLICATIONS

EPO document No. 0105078, (Vanzetti), 4/11/84.
WO 79/01156 to SIRA Institute, 12/27/79; G01N 25/72, (Stevenson et al. applicants).

Primary Examiner—Daniel M. Yasich
Attorney, Agent, or Firm—Nixon & Vanderhye

[57] ABSTRACT

Apparatus and a method for indicating static stress including residual stress in an object utilize the stress dependence of the specific heat of an object by scanning the surface of the object with a pulsed laser light source and measuring the resulting temperature changes by means of an infra red detector to provide stress information. A common scanning system including a beam splitter enables the pulsed light output to the object and the received infra red radiation to be scanned simultaneously. The optical paths of the light and infra red through the scanning system are made different so that the infra red sensor does not respond to any hot spot in the scanning system. A further laser source provides three spaced beams which are transmitted through the beam splitter so as to impinge on the surface of the object at points surrounding the instantaneous point of inspection. Reflected light from these beams is processed to give instantaneous angle of incidence information necessary to correct the infra red measurements when scanning complex objects.

13 Claims, 2 Drawing Sheets

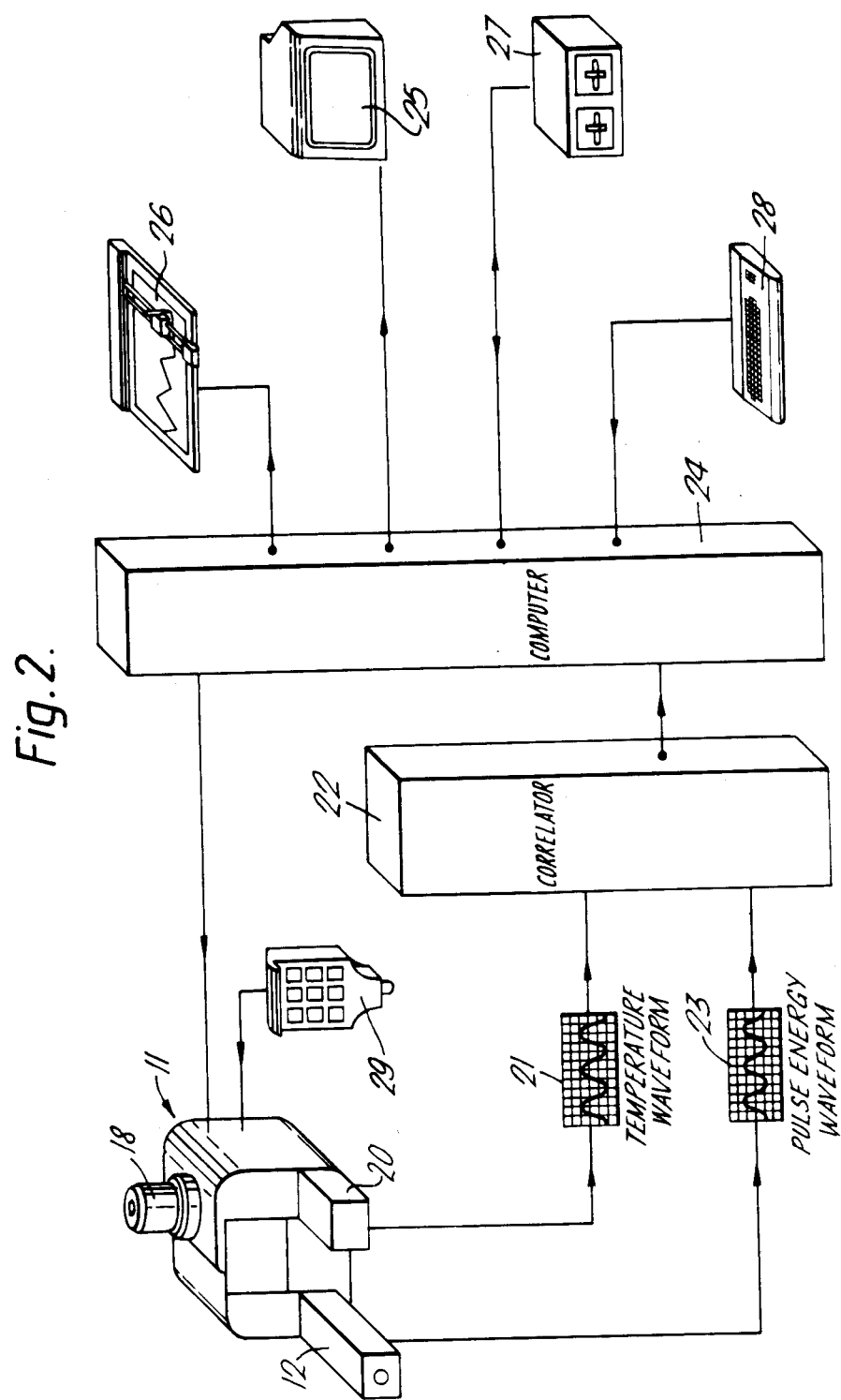

APPARATUS AND METHOD FOR STATIC STRESS MEASUREMENT IN AN OBJECT

The present invention relates to thermo-elastic stress analysis and in particular to the remote measurement of stress by non-contacting means.

Thermoelastic Stress Analysis, as described in U.S. Pat. No. 4,378,701 issued Apr. 5, 1983, is a system whereby stress in the material of a structure or component can be measured remotely and by non-contacting means, whilst subjected to dynamic loading. It makes use of the property of thermoelasticity by which very small amounts of heat are generated or absorbed when the material undergoes a compressive or a tensile stress, thereby producing small changes in temperature. This phenomenon is perhaps better appreciated in the case of a gas, it being well known that under adiabatic compression there is a rise in temperature and conversely, under expansion, the gas cools. The method of measuring the minute temperature changes involved employs an extremely sensitive infra-red detector, specially developed signal processing, and a scanning mechanism to provide, for example, a real time map of the stress pattern of the object under test on a colour TV monitor. The performance achieved can discriminate temperature down to 0.001° C. (representing a stress discrimination of 145 lb/in$^2$ in steel) with a spatial resolution of better than one mm.

Thermoelastic Stress Analysis as described in the above patent is an extremely valuable mechanical engineering tool by measuring stress under dynamic loads such as are often encountered in service conditions and supplements and in some cases supersedes previously employed methods such as brittle lacquers, strain gauges and photo-elastic techniques. Static stress, however, can only be measured using these existing techniques if the loads are capable of being applied and removed at will, albeit in slow time. However examination in both a stressed and unstressed state is often impossible, for example in the case of stresses produced during a manufacturing process, eg residual stresses on welding, or as the result of assembly and although a knowledge of the usable strength remaining may be vital to the safety of a structure or component, there are no methods at present available to the engineer or designer which can satisfactorily provide this information.

The object of the present invention is to provide a method and apparatus for measuring static stress in a body.

The present invention provides in one form a method for indicating static stress in a predetermined part of an object comprising the steps of:
 (a) applying a controlled quantity of electromagnetic energy to a predetermined surface part of the object;
 (b) measuring the resulting increase in temperature in the predetermined part of the object; and
 (c) determining from the temperature increases an indication of the local stress in the predetermined part.

The invention relies upon the dependence of the specific heat of an object under inspection on local stress. Thus by determining the specific heat from the temperature increase or observing variations in the specific heat across the surface of an object it is possible to obtain an indication of the static stress at a point on the surface or a map of the variation of static stress across the surface. The stress-dependence of the specific heat is such that a very sensitive measuring technique is required. The quantity of heat applied to a surface part must be accurately known and the temperature sensor desirably should be capable of measuring temperature changes down to 0.001° C.

Preferably the temperature is measured by detection of changes in thermal radiation emitted by the surface area of the predetermined part of the object. Advantageously the surface area of the object is scanned such that the predetermined part whose increase in temperature is measured is variable.

Variations of temperature caused by factors other than by stress related variations in specific heat should thus be minimised.

As a first step with some materials it may be desirable to coat the object with a material to make the energy absorption and emissivity as uniform as possible.

In a preferred arrangement the energy is applied cyclically to the predetermined part of the object. Advantageously the source of energy is a pulsed laser operating in the optical waveband so that surface reflections of the optical energy incident on the object do not corrupt the measurements of temperature increases.

The invention also provides apparatus for indicating static stress in a predetermined part of an object comprising means for applying a controlled quantity of energy to a predetermined part of the surface of the object and means for measuring increases in temperature of the predetermined part of the object with energy applied to the object.

Preferably the means for applying the energy operates cyclically any may be a pulsed laser operating at an optical frequency.

The means for measuring temperature increases may comprise means for determining the thermal radiation emitted by the predetermined part of the object. This may be an infra-red detector. There may be provided scanning means whereby the infra-red detector scans predetermined parts across the object. Preferably the scanning means simultaneously forms part of the energy applying means whereby the infra-red detector scans each pre-determined part across the surface of the object as the energy is applied.

Preferably signal processing means is included which receives a first output signal from the temperature measuring means and correlates this with a second signal proportional to the cyclical variation of the energy applying means thereby enabling rejection of any temperature change resulting from other random energy sources and produces an output indicating tensile or compressive stresses at the predetermined part.

Signals an order of magnitude greater than expected from stress related factors, such as those originating from surface defects, must be discounted and thus will mask the stress measurements.

In order that the invention can be more clearly understood one embodiment thereof will be described by way of example only with reference to the accompanying Drawings of which:

FIG. 2 is a block diagram of the invention incorporating the optical arrangement of FIG. 1.

Figure 1:
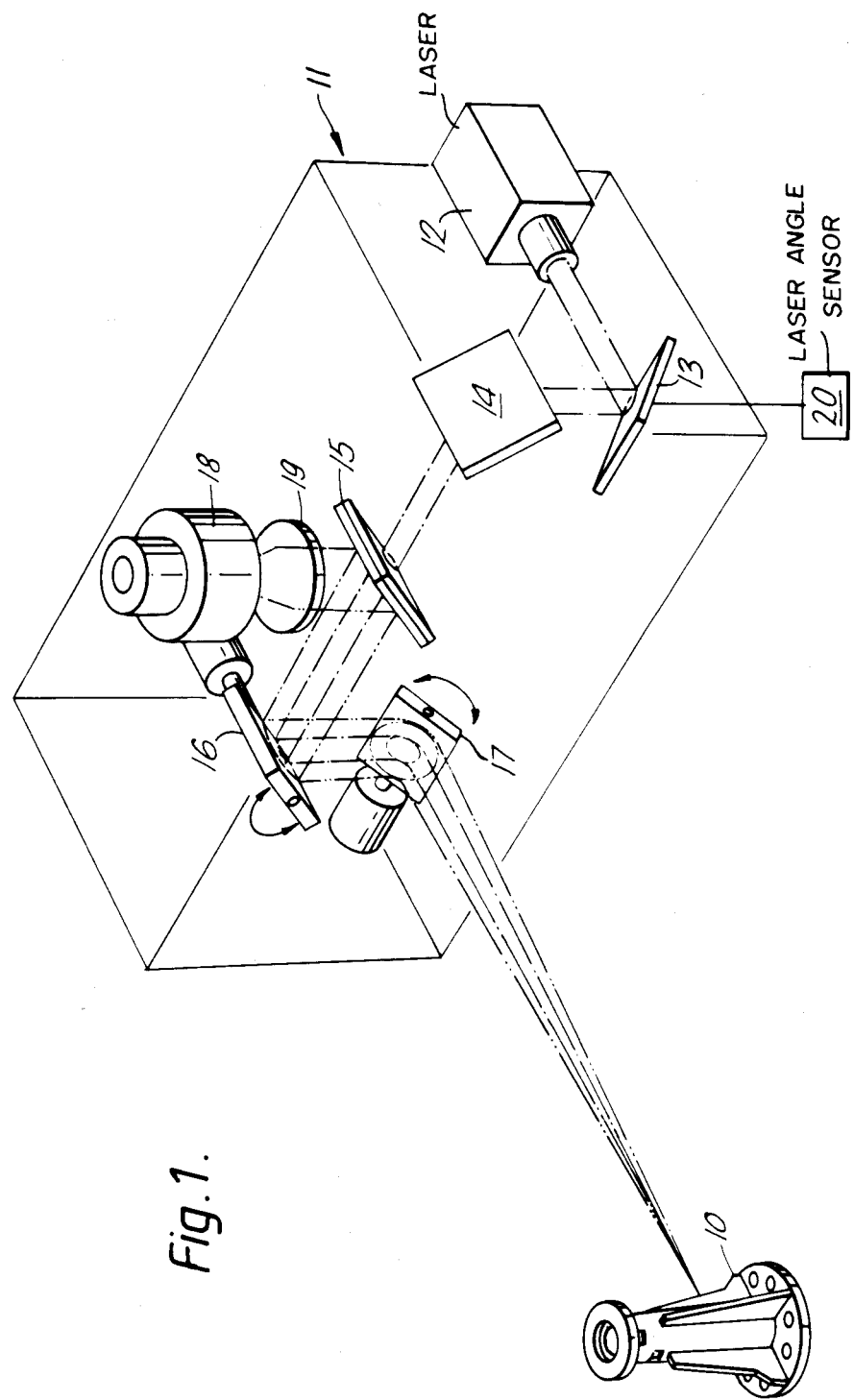
FIG. 1 is a schematic diagram of an optical arrangement of the invention.

The specific heat of a substance is defined as the head required to raise 1 g of the substance through 1° C. As is well known in the case of a gas, however, the specific heat varies considerably depending on the pressure and thus a gas which is being held in a compressed state for example will require a different amount of heat to produce a given rise in temperature as compared with the same gas at normal pressure, and similarly a given amount of energy will produce a different temperature rise. Pressure in a gas and stress in a solid describe the same physical condition and thus in a similar way the specific heat of a solid varies with the stress but to a very much smaller extent. However, since the stresses in a solid are localised by constraint of the material, the variations in specific heat are also localised and the application of a controlled quantity of energy will thus produce a different temperature rise depending on the stress state of the point under inspection.

The present invention utilises the property of the variation in specific heat with stress to measure static stress of objects, both when loaded and unloaded (residual stress).

Referring to FIG. 1, there is shown an object 10 under inspection which may be for example a relatively complex shaped item such as a base unit for supporting a radar aerial, vehicle component, a fabricated structure or the like. The surface of the unit 10 is painted matt black. Remotely spaced from the object 10 is an optical head 11 of the static stress detector. A medium power laser 12 provides an energy source which is directed via plane mirrors 13 and 14 to a beam splitter 15.

The laser beam is pulsed at a frequency of about 15 cps directing it through a chopper located in the housing of the laser 12. The pulsed laser beam is then transmitted through the beam splitter 15 and thence via an oscillating scanning mirror 16 and a synchronised rotatable stepping mirror 17 arranged to scan the laser beam over the surface of the object 10.

The laser pulses must be accurately controlled in both duration and quantity so that the energy quanta applied to the scanned surface are substantially constant. Thus the laser power suplpy must be well regulated and the beam chopping mechanism must also be precise. Where, for example, a mechanical rotating chopper is used, the blades of the chopper must be made to close tolerance.

Also housed in the optical head 11 is an infra red detector unit 18 which is arranged to receive infra red radiation emitted from the surface of the object 10 after focussing by a germanium lens 19. A single cadmium mercury telluride detector or a lead tin telluride detector may be used for the infra red detector unit 18. The beam splitter 15 is placed in the path of the infra red radiation from the object 10 such that the field of view of the detector unit 18 is subject to the same raster scan action by the scanning mirrors 16, 17 as the beam from the pulsed laser source 12. A focussing means for the laser beam is provided within the energy source and the optical elements are positioned such that the beam is accurately focussed onto the exact spot being examined by the infra red detector unit. Thus throughout the scanning movement of the mirrors 16 and 17 energy is supplied from the laser 12 to the same spot and at the same time as the infra red emission from that spot is being used to determine its change in temperature.

In practice there will not be 100% reflection of the laser light by the scanning mirrors 16 and 17. Since the laser beam is very narrow it is arranged to be directed off-axis at these mirrors while ensuring that the same spot on the item 10 under inspection is scanned by the laser and the infra red detector. This ensures that the infra red detector does not respond to any infra red emissions from the mirrors 16 and 17 resulting from heating by the laser beam.

Scanning of a complex item such as the radar aerial base unit 10 shown in FIG. 1 results in a wide range of angles of incidence of the scanning laser beam at the unit surface. Compensation for this effect must be applied. The instantaneous angle of incidence is measured by a further laser system which simultaneously scans the item under inspection. This is shown diagammatically by the laser angle sensor 20. This operates at a different frequency from the laser 12 and is transmitted through the beam splitting mirror 13 which reflects the beam from laser 12. The beam from the laser angle sensor 20, shown for convenience as a single beam, is split by a beam splitter (not shown) into three components angularly spaced about optical axis of the infra red sensing system and so as to be focussed at points equispaced around the focal point of the laser 12 beam. These points define the apices of an imaginary equilateral triangle surrounding the spot being examined. By applying an interference technique to the reflected light at a detector in the laser angle sensor 20, the differences in the unit surface to laser distances can be determined for the three points and hence the slope of the imaginary triangle. This provides the angle of incidence information which is used to correct the output signal from the infra red detector 18.

Referring now to FIG. 2, there is shown a schematic diagram of the overall system where for the sake of clarity, signal amplification and shaping circuitry has been omitted. The output electrical signal 21 from the infra red detector unit 18, corrected for the angle of incidence, representing the temperature waveform is connected to a first input of a correlator 22. A signal 23 from the laser energy source representing the pulsed energy waveform is connected to a second input of the correlator 22. The correlation product of the received temperature waveform 21 and the transmitted pulsed energy waveform 23 from the correlator 22 is connected to a computer unit 24.

The operation of the apparatus is as follows. As a result of the absorption of a pulse of energy from the laser the temperature rise of any material in a normal and unstressed condition will be a particular value. If, however, the material is under a tensile stress its specific heat will be fractionally higher and the same amount of supplied energy will give a smaller temperature rise. Similarly if under compression the specific heat will be lower than normal and the same amount of energy will consequently give a slightly greater temperature rise. Thus when the scanning mechanism is in operation with the pulsed laser source activated the temperature rise resulting from the intermittent energy being supplied can be measured at each point on the surface of the object under investigation. The output signal from the correlator 22 will thus be representative of the temperature rise and consequently the state of stress at the point of measurement. The temperature pattern resulting from the scanning movement represents the pattern of the local static stress level over the object and may be displayed on a TV monitor 25 or recorded on a chart recorder 26 or magnetic disc store 27 for subsequent analysis. The computer 24 may be provided with data from a keyboard such that the output signal from the correlator can be biassed to zero at the temperature change produced in unstressed material so that the display can readily distinguish between static stresses of tension or compression. The received data may be further processed by the computer prior to display or storage to provide desired information in any readily comprehended manner.

Various parameters of the optical head such as:
(a) the pulse frequency of the laser;
(b) the raster scan rate;
(c) depth of focus of the optical viewing system; and
(d) field of view may be manually adjustable or can be electronically controlled by the computer 24 or by means of a hand-held key pad 29.

Once the energy has been introduced into the material at each spot being examined, measurement of the temperature should ideally be made under adiabatic conditions. The present invention approximates to these conditions by using pulses of energy from an external source. The pulse frequency must be selected to be low enough for energy to be absorbed by the material and to provide the temperature change, and high enough for the measurement conditions to approximate to adiabatic conditions. Careful attention must also be paid to the surface finish of an object under investigation to ensure uniform absorption of light and emission of infra red radiation over the whole of the object. Although the invention has been described with reference to a laser source it is not necessarily limited thereto. By using a laser as described to transmit energy, for example at optical wavelengths, and then measuring infra red in a different waveband, the temperature readings will not be affected by surface reflections of the input energy.

The compensation of the angle of incidence changes during the scanning of a complex object may be made alternatively by varying the output from the pulsed laser source. In addition the mechanical chopper may be replaced by other means for producing a pulsed laser beam. The magnitude of the stress-dependent temperature changes varies from one material to another. For steel a change of up to about 4% may occur in the specific heat. For an AC temperature rise of 1° C. there will only be a change from 0° to 0.04° C. corresponding to a static stress in the range from 0 to the material to maximum. By making a measurement to 0.001° C. the system is able to discriminate a stress of about 1000 lbs. Although the invention has been described scanning a spot with a single infra red detector it would be possible to illuminate an object with a strip of light and to use a linear detector array.

The invention provides a means by which static stress can be measured easily and quickly without contact with the object under inspection and without any change in the existing stress conditions of the object.

I claim:

1. A method for indicating static stress in a predetermined part of an object comprising the successive steps of:
    (a) applying a measured pulse of electromagnetic energy to a predetermined surface part of the object;
    (b) measuring the temperature of the predetermined surface part of the object;
    (c) determining from said temperature measuring step the temperature rise of the predetermined surface part of the object and a local specific heat; and
    (d) deriving an indication of local static stress from the local specific heat.

2. A method for indicating static stress in a predetermined part of an object comprising the successive steps of:
    (a) applying a controlled quantity of electromagnetic energy to a predetermined surface part of the object causing a temperature increase;
    (b) scanning the object such that the controlled quantities of electromagnetic energy are applied to cyclically varied surface parts of the object;
    (c) measuring said temperature increase in each of said predetermined surface parts of the object;
    (d) correlating said temperature increase measurements with a signal proportional to the cyclical variation of the applied electromagnetic energy to reject any temperature change resulting from other random energy sources to produce output signals resulting from static stress at the predetermined part;
    (e) computing from said output temperature signal and from the applied quantity of electromagnetic energy the specific heat in each of said predetermined surface parts and from said computed specific heats, indications of the static stress.

3. A method for indicating static stress as claimed in claim 1 or 2 wherein said temperature measuring step comprises detection of changes in thermal radiation emitted by said predetermined surface part of the object.

4. A method for indicating static stress as claimed in claim 2 wherein the object is first coated with a material to make the energy absorption and emissivity as uniform as possible.

5. An apparatus for indicating static stress in a predetermined part of an object comprising:
    means for cyclically applying a controlled quantity of electromagnetic energy to a predetermined surface part of the object causing a temperature increase,
    means for measuring said temperature increase in the predetermined part of the object; and
    means for determining from the temperature increase the static stress in the predetermined part; wherein there is further included:
    signal processing means for receiving a first output signal from the temperature measuring means and for correlating said first output signal with a second signal proportional to the cyclical variation of the energy change resulting from other random energy sources and producing an output indicating stresses at the predetermined part.

6. An apparatus for indicating static stress in a predetermined part of an object comprising:
    (a) means for applying a measured pulse of electromagnetic energy at a predetermined surface part of the object;
    (b) means for measuring the temperature of the predetermined surface part of the object; and
    (c) computing means for determining from said temperature measuring means the temperature rise of the predetermined surface part of the object, the specific heat of said surface part and, from said specific heat, an indication of the static stress of said surface part.

7. Apparatus for indicating static stress in a predetermined part of an object comprising:
    (a) means for applying a controlled quantity of electromagnetic energy to a predetermined surface part of the object causing a temperature increase;
    (b) scanning means for cyclically varying the surface part to which said quantity of electromagnetic energy is applied;

(c) means for measuring said temperature increase in each of said predetermined surface parts of the object; and (d) signal processing means for receiving a first output signal from the temperature measuring means and for correlating said first output signal with a second signal output from said scanning means and proportional to the cyclical variation of the energy applying means thereby enabling rejection of any temperature change resulting from other random energy sources and producing an output signal indicating static stress at the predetermined part.

8. Apparatus for indicating static stress in a predetermined part of an object comprising:

(a) means for applying a controlled predetermined pulse of electromagnetic energy to a predetermined surface part of the object;

(b) scanning means for cyclically varying the surface part to which said pulse of electromagnetic energy is applied;

(c) means for measuring the temperature of each of said predetermined surface parts of the object;

(d) correlation means to correlate first signals corresponding to said temperatures and second signals corresponding to the cyclical variation of the energy applying means to produce a correlated temperature signal; and (e) computing means for determining from said correlated temperature signal the temperature rises of the predetermined surface parts of the object, from said temperature rises and the quantity of said predetermined pulse of applied electromagnetic energy the specific heats of said predetermined surface parts, and from said specific heats indications of the static stress of said surface parts.

9. An apparatus for indicating static stress as claimed in one of claims 5, 6, 7 or 8 wherein the means for measuring comprises means for determining the thermal radiation emitted by the predetermined part of the object.

10. An apparatus for indicating static stress as claimed in claim 9 wherein the means for determining the thermal radiation emitted is an infra red detector.

11. An apparatus for indicating static stress as claimed in claim 9 including means to normalise the measurements.

12. An apparatus for indicating static stress as claimed in claim 9 wherein the scanning means is combined with the temperature measuring means.

13. An apparatus for indicating static stress as claimed in claim 12 wherein electromagnetic energy applied to the object is not coincident with the optical path of any infrared radiation emitted by the object.

* * * * *